United States Patent Office 2,789,134
Patented Apr. 16, 1957

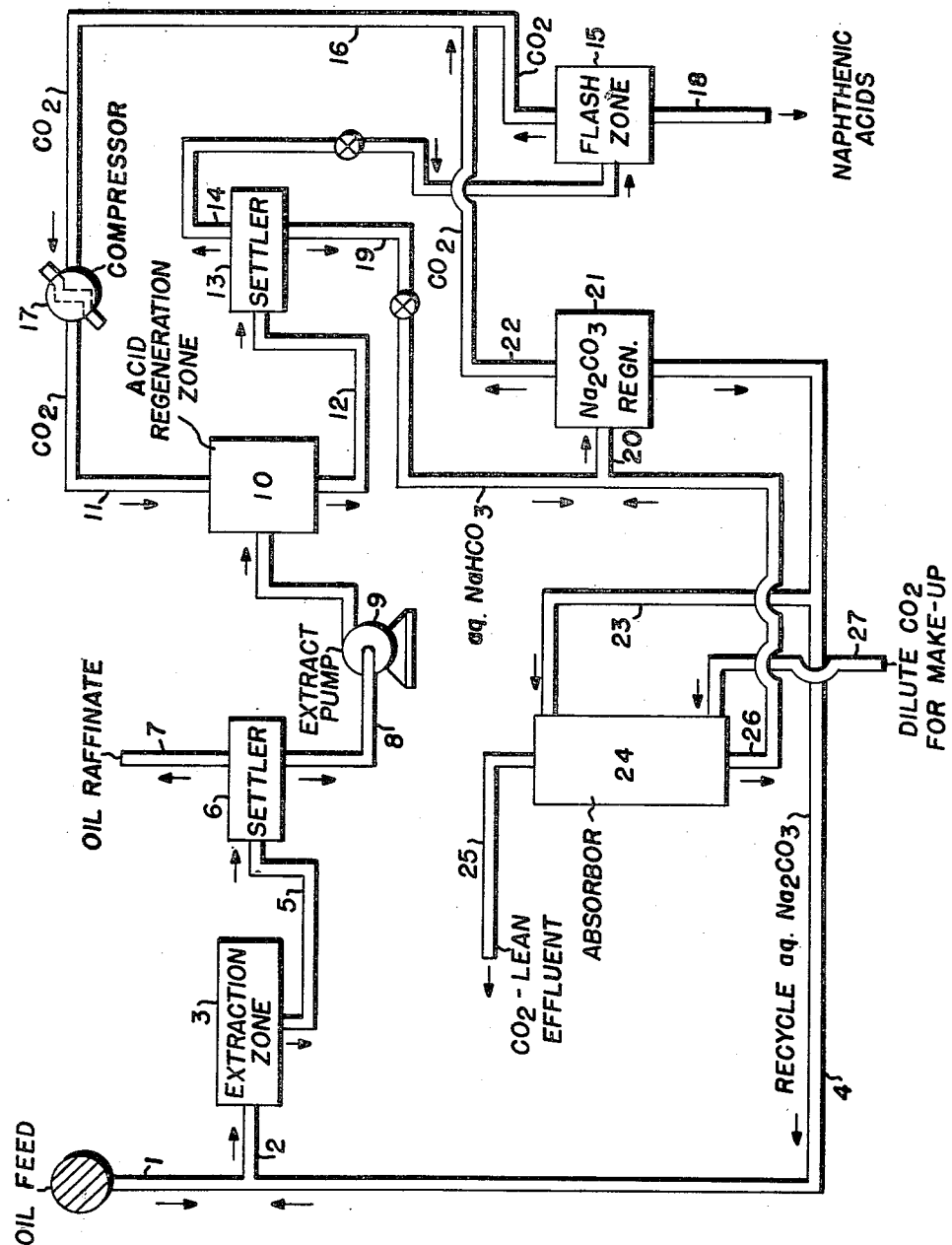

2,789,134

RECOVERY OF NAPHTHENIC ACIDS

Joseph F. Nelson, Westfield, and James H. McAteer, Cranford, N. J., assignors to Esso Research and Engineering Company, a corporation of Delaware Application June 19, 1953, Serial No. 362,892

3 Claims. (Cl. 260—514)

This invention relates to a novel process for the recovery of organic carboxylic acids and particularly naphthenic acids.

Naphthenic acids are found in naphthenic base crude oils, particularly those obtained from California, Colombia, Venezuela, Rumania, Russia, etc. The naphthenic acids are conventionally recovered by treating the crude petroleum oil or fractions thereof with aqueous solutions of alkalines such as caustic soda to form sodium naphthenates which are soluble in the aqueous solutions. The aqueous solutions are then separated from the petroleum oil and treated with mineral acids such as sulfuric, hydrochloric, etc., to regenerate and separate the crude naphthenic acids.

Naphthenic acids are utilized extensively in the production of paint driers, emulsifying agents, textiles and wood preservative agents and gelling agents. There is, therefore, a distinct need for improved, economic, and preferably continuous processes for recovering naphthenic acids.

This invention provides an improved method for obtaining high grade naphthenic acids from naphthenate solutions and from naphthenic acid-containing petroleum oils. The method comprises contacting an aqueous solution of inorganic naphthenates with carbon dioxide at an elevated pressure of 100 p. s. i. g., preferably of at least 200 p. s. i. g. for quantitative regenartion to convert the naphthenates to naphthenic acids. Because of the advantages of this carbon dioxide regeneration step as further detailed below, this invention also provides an improved cyclic process for recovering the naphthenic acids from petroleum oils containing them. This continuous process comprises contacting the petroleum oil with an aqueous solution containing sodium carbonate or bicarbonate, or their mixtures, subjecting the resulting naphthenates to the beforementioned treatment with carbon dioxide to "spring" the naphthenic acids, regenerating the aqueous sodium carbonate, and re-utilizing the aqueous sodium carbonate for additional extraction. Alternatively, the residual bicarbonate solution may be utilized for extraction without regeneration.

The inorganic aqueous naphthenates treated with the carbon dioxide under pressure are those obtained by the extraction of the naphthenic acids from petroleum or fractions thereof with aqueous alkali metal hydroxides or their carbonates and bicarbonates, or mixtures thereof. Because of cost considerations, the sodium naphthenates are usually employed.

Carbon dioxide had not been found satisfactory in previous work on "springing," since the carbonic acid is weaker than the naphthenic acids. The utilization of the elevated pressures specified in this invention makes it possible to have the weaker carbonic acid derived from $CO_2$ and $H_2O$ replace the stronger naphthenic acids from their aqueous salt solutions.

The typical conditions utilized in the process of this invention are as follows. The preferred concentration of extraction media, i. e., aqueous NaOH, NaHCO$_3$, Na$_2$CO$_3$, is 0.4 to 1 molar. Other concentrations can be used. The temperature in the extraction and "springing" operations, which are conducted in the liquid phase, is in the range of from 10°–120° C. When employing aqueous bicarbonate solutions for extracting the acids, temperatures greater than 30° C. are required in the extraction step.

This invention will be better understood by reference to the flow diagram shown in the drawing.

With reference to the drawing, a naphthenic acid-containing petroleum oil feed enters extraction zone 3 through lines 1 and 2. 0.5 molar sodium carbonate enters the extraction zone 3 through lines 4 and 2. The extraction is conducted in the liquid phase with intimate mixing at a temperature of about 70° C. Any $CO_2$ evolved during mixing may be collected and sent by a line (not shown) to the compressor for use in the subsequent regeneration step. The resultant mixture consisting of an organic phase and an aqueous sodium naphthenate-containing phase enters settler 6 through line 5. The oil raffinate is withdrawn overhead through line 7 and the aqueous phase is withdrawn from the settler by means of line 8 and pump 9 to the naphthenic acid regeneration zone 10. Compressed $CO_2$ gas is pumped into zone 10 through line 11. The pressure in the acid regeneration zone is conveniently maintained at about 220 p. s. i. g., and the temperature is 70° C. The naphthenic acids are consequently regenerated and the resultant mixed aqueous phase and naphthenic acid phase are sent through line 12 to settler 13. The naphthenic acid phase is taken off from settler 13 through line 14 to a flashing zone 15. Dissolved $CO_2$ is flashed off by pressure release, and conveniently recycled through line 16 to compressor 17. The naphthenic acid product is withdrawn from flash zone 15 through line 18.

The aqueous layer withdrawn from settler 13 through line 19 contains sodium bicarbonate. Only minor proportions of sodium carbonate are present in this solution. The aqueous phase is sent through line 20 to sodium carbonate regenerator 21. This aqueous phase is heated so as to desorb excess $CO_2$ and to convert bicarbonate to carbonate. The $CO_2$ is taken off through line 22 to line 16 to be recompressed. A portion of the sodium carbonate recycle solvent is sent through lines 4 and 23 to absorber 24 in which makeup $CO_2$ from a dilute $CO_2$-containing stream is selectively absorbed and the sodium carbonate is converted into sodium bicarbonate. A $CO_2$-lean effluent is taken overhead through line 25. Sodium bicarbonate is sent through lines 26 and 20 to sodium carbonate regeneration zone 21 so as to give up excess $CO_2$. Dilute $CO_2$ for makeup is sent through line 27 to absorber 24. The aqueous sodium carbonate extraction medium is recycled through lines 4 and 2 to the extraction zone 3 so that a completely continuous process is set up.

This invention will be better understood by reference to the following examples of the recovery of naphthenic acids according to the process of this invention.

Example I

Samples of aqueous sodium naphthenates obtained by the commercial extraction of a diesel oil distillate with aqueous caustic were saturated at room temperature with $CO_2$ at different pressures. The regenerated naphthenic acid phase was permitted to cream and was then separated from the residual aqueous phase. These operations were also carried out at room temperature and at the $CO_2$ pressure used for saturating the original naphthenate solution. A sample of the same solution was treated with an excess of concentrated $H_2SO_4$ in the normal manner and the regenerated naphthenic acids similarly recovered to provide a control run. The data are shown below:

| Acid Employed for Regeneration | $H_2SO_4$ | $CO_2$ | $CO_2$ | $CO_2$ | $CO_2$ |
|---|---|---|---|---|---|
| Pressure, p. s. i. g | 0 | 0 | 110 | 220 | 425 |
| Regenerated Naphthenic Acids: | | | | | |
| Yield, Vol. Percent | 13.5 | 13.1 | 12.1 | 12.4 | 13.5 |
| Acid No., mgm. KOH/gm | 204 | 150 | 189 | 195 | 213 |
| Unsaponifiables, Wt. Percent | 14.4 | 33.3 | 19.3 | 16.9 | 10.2 |

It is apparent that the use of $CO_2$ pressures of about 100 p. s. i. g. gives a marked improvement over atmospheric pressure (0 p. s. i. g.). However, when quantitative regeneration of the naphthenic acids is desired, $CO_2$ pressures in excess of about 200 p. s. i. g. are preferred.

*Example II*

Two experiments were carried out in which separate portions of a cracked diesel oil fraction having an end-point of about 625° F. were treated with dilute aqueous caustic and a dilute aqueous solution of mixed $Na_2CO_3$ and $NaHCO_3$, respectively. Each of the resulting extracts was divided into two portions. The first was acidified with concentrated $H_2SO_4$ and the second with $CO_2$ under 400 p. s. i. g. to regenerate the naphthenic acids. The results are tabulated below:

| Experiment No | 1 | | 2 | |
|---|---|---|---|---|
| Extraction Solvent | Dilute aqueous NaOH | | Dilute aqueous $Na_2CO_3+NaHCO_3$ | |
| Naphthenic Acid Regeneration: | | | | |
| Acid employed | $H_2SO_4$ | $CO_2$ | $H_2SO_4$ | $CO_2$ |
| Temperature, °C | 25 | 25 | 25 | 75 |
| Pressure, p. s. i. g | 0 | 400 | 0 | 400 |
| Naphthenic Acid: | | | | |
| Acid No., mgm. KOH/gm | 221 | 218 | 236 | 221 |
| Unsaponifiables, Wt. Percent | 9.5 | 10.8 | 7.7 | 11.8 |
| Yield, Wt. Percent of cracked diesel oil | 0.70 | 0.79 | 0.57 | 0.58 |

In each experiment the data show that $CO_2$ at 400 p. s. i. g. is comparable with $H_2SO_4$ for this purpose. The use of $CO_2$ under pressure for the regeneration of naphthenic acids is not limited to operation at room temperature. The results obtained in Experiment No. 2 with $CO_2$ show its effectiveness at elevated temperatures as well. Indeed, the use of elevated temperatures is advantageous in assisting the more rapid settling of the naphthenic acid and acidified aqueous layers following saturation with $CO_2$.

As explained above, aqueous sodium carbonate of the indicated concentration is re-utilized in the extraction step. When rich in sodium bicarbonate it can be either used as an extraction medium or first heated so as to drive off the $CO_2$ and give a sodium carbonate solution for utilization in the extraction. If desired, the $CO_2$ liberated in any of the steps of the process can be collected and compressed for "springing" the naphthenic acids. Makeup $CO_2$ may be obtained from cylinders or other sources of pure $CO_2$. In addition, as was discussed above, makeup $CO_2$ can be recovered from dilute gaseous streams by contacting the dilute $CO_2$ with any of the aqueous streams in the process which are rich in sodium carbonate.

The naphthenic acids can also be regenerated in a stepwise manner, i. e., by controlling the pressure at selected levels. Such a stepwise operation can be utilized to recover first a group of high molecular weight (lower acid number) acids by using lower $CO_2$ pressures followed in subsequent steps by the regeneration of the lower molecular weight acids using $CO_2$ at high pressures.

The process of this invention can also be utilized for the regeneration and recovery of other organic, especially carboxylic, acids. It is applicable, in short, to organic acids whose dissociation constants at room temperature lie in the range of from about $1\times10^{-9}$ to $1\times10^{-5}$. Thus, for example, the invention can be utilized for the regeneration of acetic acid and its homologs and benzoic acid and its homologs. The commercial naphthenic acids have dissociation constants at room temperature of from $1\times10^{-3}$ to $1\times10^{-6}$ depending upon their source and molecular weight. In the case of acids which are miscible with the aqueous phase under regeneration conditions, the use of a solvent immiscible with the aqueous phase permits satisfactory recovery of the regenerated acid.

Among the advantages of the process of this invention is that the corrosive and costly operation of extracting by strong caustic and "springing" by mineral acids is replaced by the more economical, milder conditions of the process of this invention. In addition, no chemicals are used except those required to make up for mechanical losses. This represents a distinct advantage.

It is to be understood that the invention is not limited to the specific examples, which have been offered merely as illustrations, and that modifications may be made in equipment and conditions within the ranges specified without departing from the spirit of this invention.

What is claimed is:

1. A continuous process for recovering naphthenic acids from a naphthenic acid-containing petroleum diesel oil distillate fraction having an end point of about 625° F. which comprises the steps of extracting the diesel oil fraction with an aqueous solution of a sodium salt selected from the group consisting of sodium carbonate, sodium bicarbonate, and their mixtures; separating the resulting mixture into an organic phase and an aqueous sodium naphthenate-containing phase; separating the aqueous phase from the organic phase; contacting the separated aqueous phase with carbon dioxide at a pressure in excess of 100 p. s. i. g. in a pressure zone to convert the naphthenates to naphthenic acids; separating this resulting mixture at the aforesaid carbon dioxide pressure into an aqueous phase containing dissolved sodium bicarbonate and a naphthenic acid organic phase; converting the aqueous sodium bicarbonate to aqueous sodium carbonate and carbon dioxide; recycling the liberated carbon dioxide to the aforementioned pressure zone; recycling the aqueous sodium carbonate phase to the extraction step; and freeing the naphthenic acids of carbon dioxide to obtain the naphthenic acid product.

2. The process of claim 1 in which the carbon dioxide pressure is at least 200 p. s. i. g. and temperatures in the range of about 75°–120° C. are maintained in the extraction and carbon dioxide contacting-naphthenic acid regeneration steps.

3. The process of claim 2 in which the aqueous sodium carbonate solution utilized in the extraction step has a concentration in the range of from 0.4 to 1 molar.

References Cited in the file of this patent

UNITED STATES PATENTS

| 2,424,158 | Fuqua et al. | July 15, 1947 |
| 2,581,139 | Prophet | Jan. 1, 1952 |

FOREIGN PATENTS

| 341,654 | Germany | Oct. 5, 1921 |